United States Patent
Darmon et al.

(10) Patent No.: US 12,112,715 B2
(45) Date of Patent: Oct. 8, 2024

(54) REFLECTIVE DISPLAY MIRROR HINGE MEMORY REDUCTION SYSTEMS AND METHODS

(71) Applicant: Apple Inc., Cupertino, CA (US)

(72) Inventors: Denis M Darmon, Boulder, CO (US); Kanghoon Jeon, San Jose, CA (US); Jose A Dominguez-Caballero, San Jose, CA (US); Bilin Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/353,622

(22) Filed: Jul. 17, 2023

(65) Prior Publication Data

US 2024/0096294 A1 Mar. 21, 2024

Related U.S. Application Data (60) Provisional application No. 63/376,548, filed on Sep. 21, 2022.

(51) Int. Cl.
*G02B 26/08* (2006.01)
*G09G 3/34* (2006.01)
*H04N 11/20* (2006.01)

(52) U.S. Cl.
CPC ......... *G09G 3/346* (2013.01); *G02B 26/0833* (2013.01); *G09G 2320/0233* (2013.01); *G09G 2320/0626* (2013.01); *G09G 2330/021* (2013.01); *G09G 2370/00* (2013.01)

(58) Field of Classification Search
CPC .................................................. G02B 27/0172
See application file for complete search history.

(56) References Cited

U.S. PATENT DOCUMENTS

| | | |
|---|---|---|
| 7,019,880 B1 | 3/2006 | Huibers et al. |
| 7,643,195 B2 | 1/2010 | Ishii et al. |
| 7,710,635 B2 | 5/2010 | Douglass et al. |
| 7,719,740 B2 | 5/2010 | Oden |
| 7,869,115 B2 | 1/2011 | Endo et al. |
| 8,462,421 B2 | 6/2013 | Shirai et al. |
| 11,074,074 B2 | 7/2021 | Lakshminarayanan et al. |

(Continued)

OTHER PUBLICATIONS

Tristan Garcia, Texas Instruments, "DLP5531-Q Chipset Video Processing for Light Control Applications," Application Report DLPA101, Oct. 2018.

*Primary Examiner* — Nan-Ying Yang
(74) *Attorney, Agent, or Firm* — Fletcher Yoder P.C.

(57) ABSTRACT

A device may include an electronic display to display image frames. The display may include illuminators that generate light and mirrors that selectively direct the light to pixel locations based bitplanes that set the arrangement of the mirrors. Additionally, the device may include duty cycle balancing circuitry that generates and provides duty cycle balancing signals to the electronic display. In response to the duty cycle balancing signals, the electronic display is implements balancing on bitplanes during at least a first portion of off periods during the image frames and implements balancing off bitplanes during at least a second portion of the off periods such that, in the aggregate, a ratio of respective on times of the mirrors to respective off times of the mirrors is balanced across the image frames during the off periods.

20 Claims, 9 Drawing Sheets

(56) References Cited

U.S. PATENT DOCUMENTS

| | | | |
|---|---|---|---|
| 2008/0074621 A1* | 3/2008 | Ichikawa | G03B 21/008 353/99 |
| 2009/0201418 A1* | 8/2009 | Endo | H04N 9/3111 348/453 |
| 2021/0141238 A1 | 5/2021 | Pertierra et al. | |

* cited by examiner

REFLECTIVE DISPLAY MIRROR HINGE MEMORY REDUCTION SYSTEMS AND METHODS

CROSS-REFERENCE TO RELATED APPLICATIONS

This application claims priority to U.S. Provisional Application No. 63/376,548, filed on Sep. 21, 2022, and entitled "Reflective Display Mirror Hinge Memory Reduction Systems and Methods," the contents of which is hereby incorporated by reference in its entirety.

SUMMARY

The present disclosure generally relates to reflective technology displays and reducing hinge memory associated with mirrors of reflective technology displays.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A mirror of a reflective technology display may include a reflector mounted on a hinge that can articulate the reflector between the "on" position (e.g., directing light towards a pixel location) and the "off" position (e.g., directing light towards a light attenuator or otherwise away from the pixel location). Over the life of the electronic display, the mirrors may be directed to either the on position or off position multiple times. However, in some scenarios, the difference between the amount of time or times a mirror is set to the on position versus the amount of time or times the mirror is set to the off position may accumulate. A landed duty cycle denotes this difference as a ratio of percentages of when an individual mirror landed in the on position versus landed in the off position.

In some scenarios, the hinge of a mirror may exhibit hinge memory, favoring and possibly sustaining just one position (e.g., the on position or the off position), which may lead to image artifacts associated with an incorrect position of the mirror. Furthermore, asymmetric landed duty cycles for a mirror may increase the likelihood of that mirror exhibiting hinge memory.

In some embodiments, an emission period of the light emissions for an image frame may take up less than the entire image frame, leaving an off period between light emissions. During such off periods, the mirrors (e.g., all or a portion of the mirrors) may be set to the on position or off position to help balance the landed duty cycle. For example, in one embodiment, the mirrors may be set to the off position for half of the off period and set to the on position for the other half of the off period according to respective balancing bitplanes. Moreover, in some embodiments, the mirrors may be set to the off position during the off period of a first image frame and set to the on position during the off period of the next image frame. As such, the landed duty cycle of the mirrors may have a 50/50 balance during the off periods, weighting the overall landed duty cycle towards a 50/50 balance and reducing the likelihood of hinge memory.

Furthermore, this may be accomplished without using multiple complex arrays of counter-bitplanes that would counteract the on-off-time positions of the different respective mirrors. Such counter-bitplanes may utilize additional resources (e.g., power, processing bandwidth) and may preclude powering down (or reducing utilization of) portions of the electronic display/processing circuitry during the off period. Indeed, by using the systems and methods of this disclosure during the off period, some circuitry may be placed into a lower-power mode or turned off instead of staying on and providing numerous counter-bitplanes over a high-speed communication link. Thus, the systems and methods of this disclosure may save a significant amount power while still reducing hysteresis effects of mirrors staying in the "on" or "off" positions during the off periods over the lifetime of the electronic display. This may improve the useful lifetime of the electronic display by reducing or eliminating mura artifacts that could arise due to such hysteresis while providing significant power savings.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the brightness and color of the light emitted from viewable pixel locations based on corresponding image data. For example, an image data source may provide image data as a stream of pixel data, in which data for each pixel location indicates a target luminance (e.g., brightness and/or color) for that pixel locations. Some electronic displays utilize display pixels at the pixel locations to modulate the amount of light emitted directly (e.g., by adjusting an amount of light generated by a self-emissive pixel) or indirectly (e.g., by adjusting a transmissivity of the display pixel). Additionally or alternatively, the electronic display may include illuminators (e.g., backlights or projectors) that generate light for several different pixels and one or more mirrors that selectively direct a portion of the generated light to be emitted at the pixel locations based on luminance values of the image data corresponding to the pixel locations. Such displays may include but are not limited to reflective technology displays (e.g., digital micro-mirror device (DMDs), ferroelectric-liquid-crystal-on-silicon (FL-COS) display, etc.).

In general, reflective technology displays utilize one or more illuminators (e.g., backlights, projectors, etc.) such as light emitting diodes (LEDs), organic LEDs (OLEDs), etc. and a set of mirrors to direct light to viewable pixel positions according to the image data. For example, a mirror may reflect a portion of the generated light to a pixel location for a certain duty cycle (e.g., relative "on" time during the image frame) to provide a particular luminance level for the image frame. The mirrors may direct light to either the pixel locations or to one or more light attenuators. For example, if a pixel location is not to receive light (e.g., based on the image data), a mirror may direct the light from the illuminator to a light attenuator instead of the pixel location, effectively turning "off" the pixel for the pixel location during that time. In some embodiments, an image frame may be divided into multiple sub-frames such that the mirrors alternate between directing the generated light to the pixel location and the light attenuator such that, in the aggregate, the amount of time (e.g., duty cycle) that the pixel location is emitting the generated light is proportional to the desired luminance output at the pixel location (e.g., according to the image data).

In some embodiments, a set of bitplanes may be used to set the arrangement of the mirrors that control the light to the pixel locations. Each bitplane may be indicative of a set of mirror activations based on the image data. For example, a bitplane may set a portion of the mirrors to reflect light generated by the illuminator to a respective portion of pixel locations, and set other mirrors, associated with other pixel locations, to reflect the light to the light attenuator(s). As such, the bitplane may designate certain pixel locations as "on" and other pixel locations as "off". During an image frame, multiple bitplanes for each color component may be implemented such that, in the aggregate, the relative on/off time for each pixel location is indicative of the display image data for each color component and thus the image. As should be appreciated, the human eye may temporally average the light emissions to perceive the image over the image frame. As used herein, a bitplane may be any set of data that designates mirror positions for each of the mirrors.

A mirror of a reflective technology display may include a reflector mounted on a hinge (e.g., torsion hinge) that can articulate the reflector between the "on" position (e.g., directing light towards the pixel location) and the "off" position (e.g., directing light towards the light attenuator). Furthermore, power may be applied to one or more electrodes at the mirror to generate an electromagnetic force (e.g., electrostatic attraction) that moves and sets the state of the mirror. Over the course of the life of the electronic display, the mirrors may be directed to either the on position or off position multiple times. However, in some scenarios, the difference between the number of times a mirror is set to the on position versus the number of times the mirror is set to the off position may accumulate. A landed duty cycle denotes this difference as a ratio of percentages of when an individual mirror landed in the on position versus landed in the off position. For example, a landed duty cycle of 50/50 is indicative of a mirror that has had half of its past activations be to the on position and half of its past activations to the off position.

In some scenarios, the hinge of a mirror may exhibit hinge memory, favoring and possibly sustaining just one position (e.g., the on position or the off position), which may lead to image artifacts associated with an incorrect position of the mirror. Furthermore, asymmetric landed duty cycles for a mirror may increase the likelihood of the hinge for that mirror exhibiting hinge memory. Additionally, the degree of the asymmetry may be proportional to the reduced lifespan of the hinge and mirror. As such, it may be desirable to balance the landed duty cycle of the mirrors of the reflective technology display.

In some embodiments, an emission period of the light emissions for an image frame may take up less than the entire image frame, leaving an off period between light emissions. During such off periods, the mirrors (e.g., all or a portion of the mirrors) may be set to the on position or off position to help balance the landed duty cycle. For example, in one embodiment, the mirrors may be set to the off position for half of the off period and set to the on position for the other half of the off period. Moreover, in some embodiments, the mirrors may be set to the off position during the off period of a first image frame and set to the on position during the off period of the next image frame. As such, the landed duty cycle of the mirrors may have a 50/50 balance during the off periods, weighting the overall landed duty cycle towards a 50/50 balance and reducing the likelihood of hinge memory.

Figure 1:
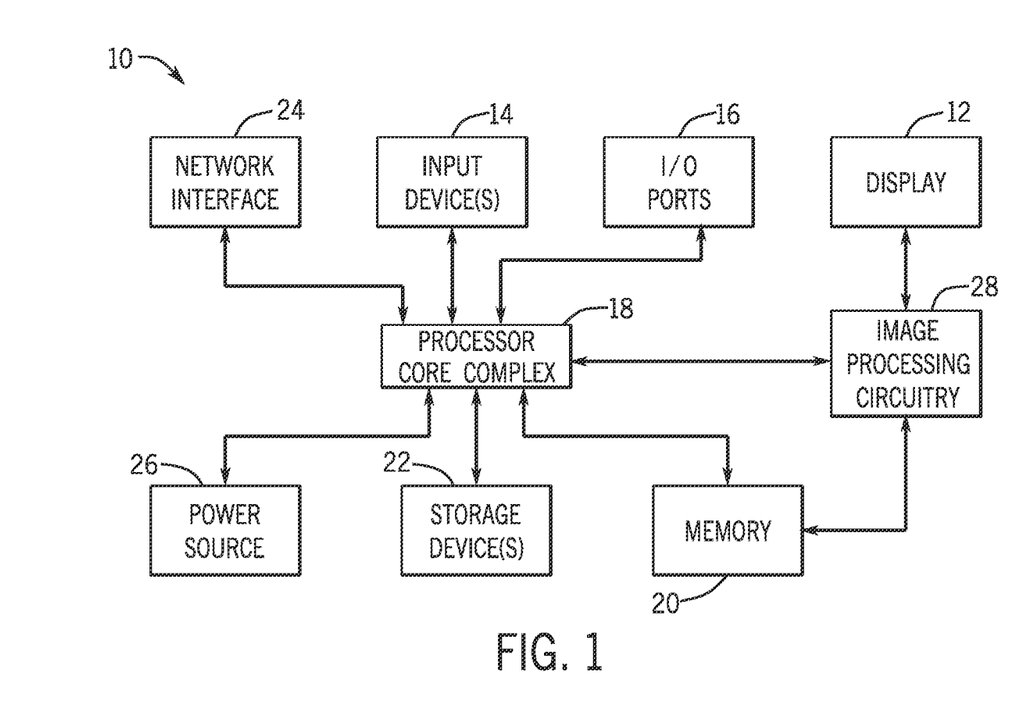
FIG. 1 is a schematic block diagram of an electronic device, in accordance with an embodiment.

With the foregoing in mind, FIG. 1 is an example electronic device 10 with an electronic display 12 having independently controlled color component illuminators (e.g., projectors, backlights, etc.). As will be described in more detail below, the electronic device 10 may be any suitable electronic device, such as a handheld electronic device, a tablet electronic device, a notebook computer, smart glasses, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include cache memory or random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
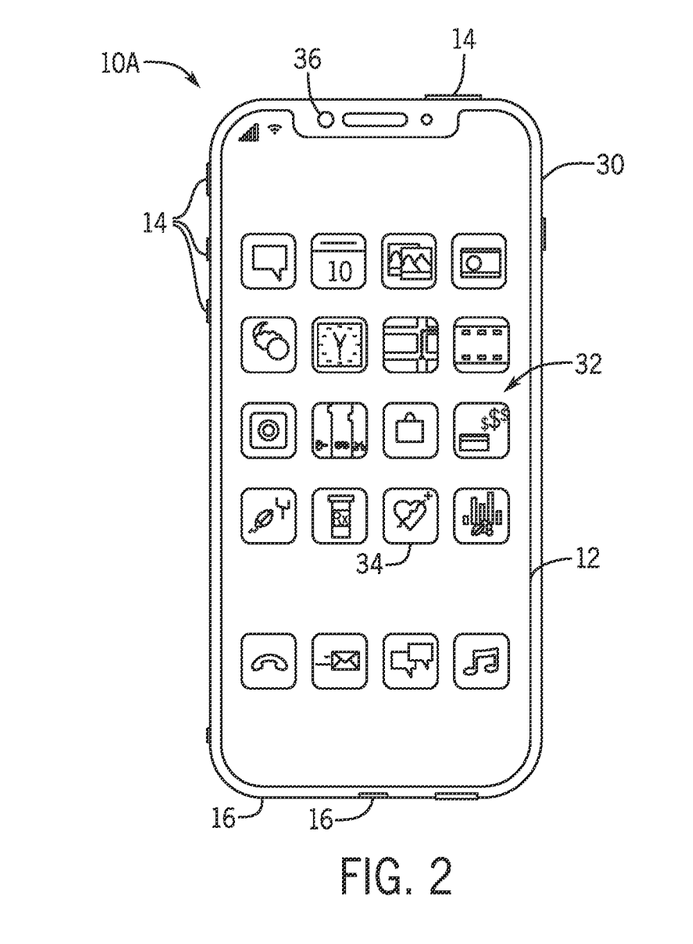
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
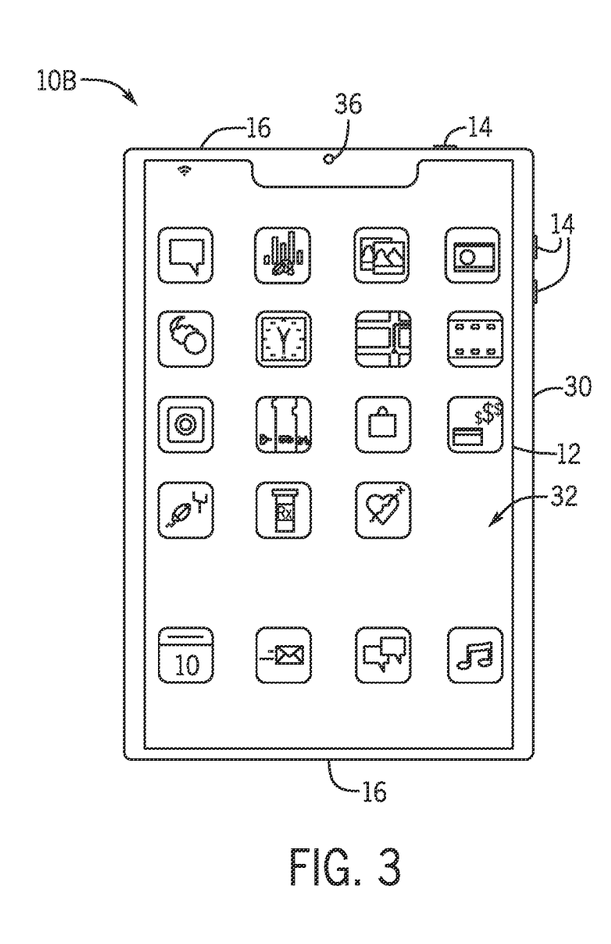
FIG. 3 is a front view of a tablet device representing an example of the electronic device of FIG. 1, in accordance with an embodiment.
Figure 4:
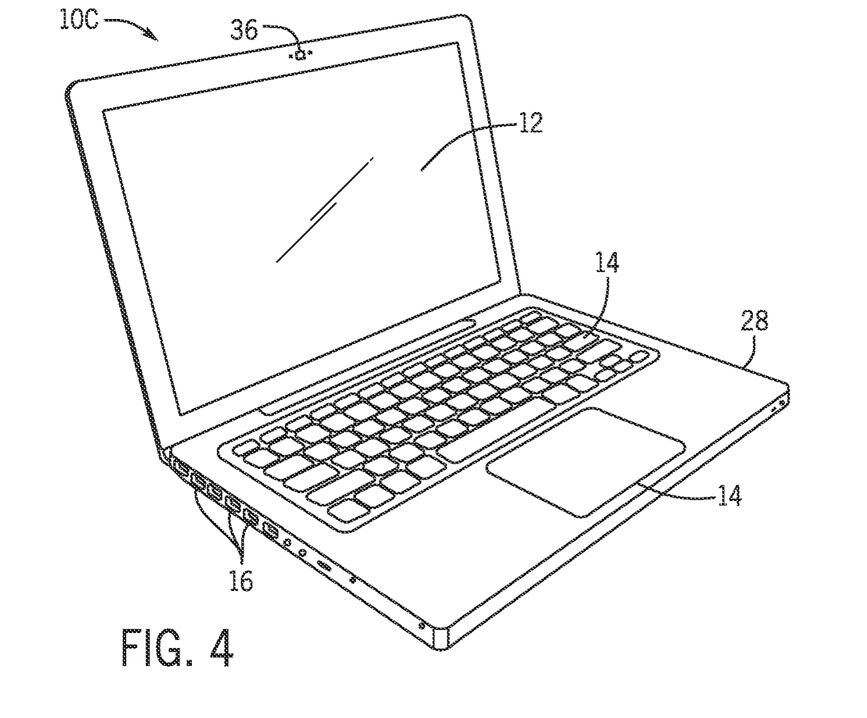
FIG. 4 is a front view of a notebook computer representing an example of the electronic device of FIG. 1, in accordance with an embodiment.
Figure 5:
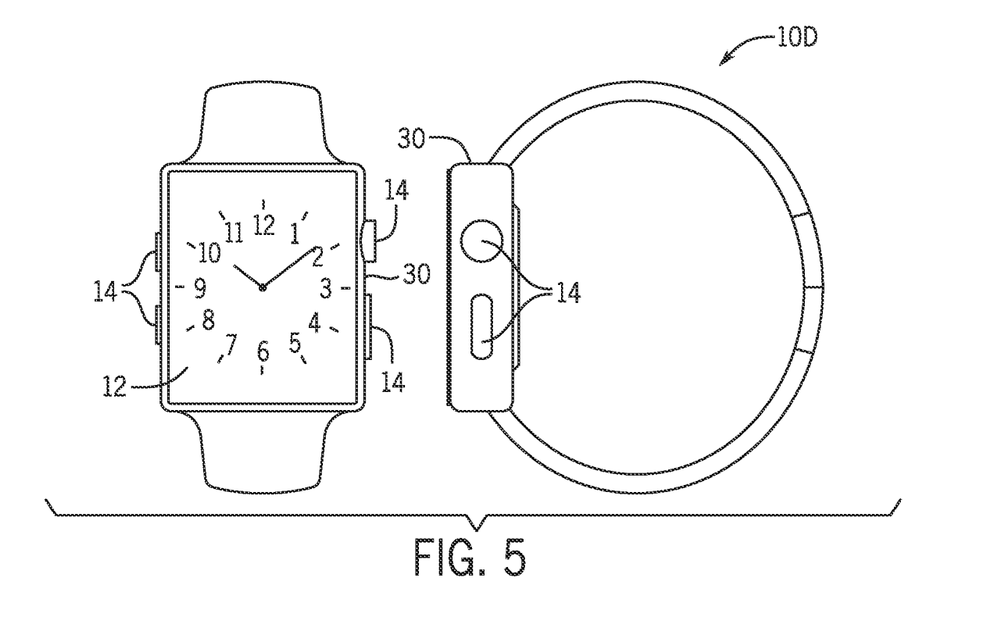
FIG. 5 are front and side views of a watch representing an example of the electronic device of FIG. 1, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
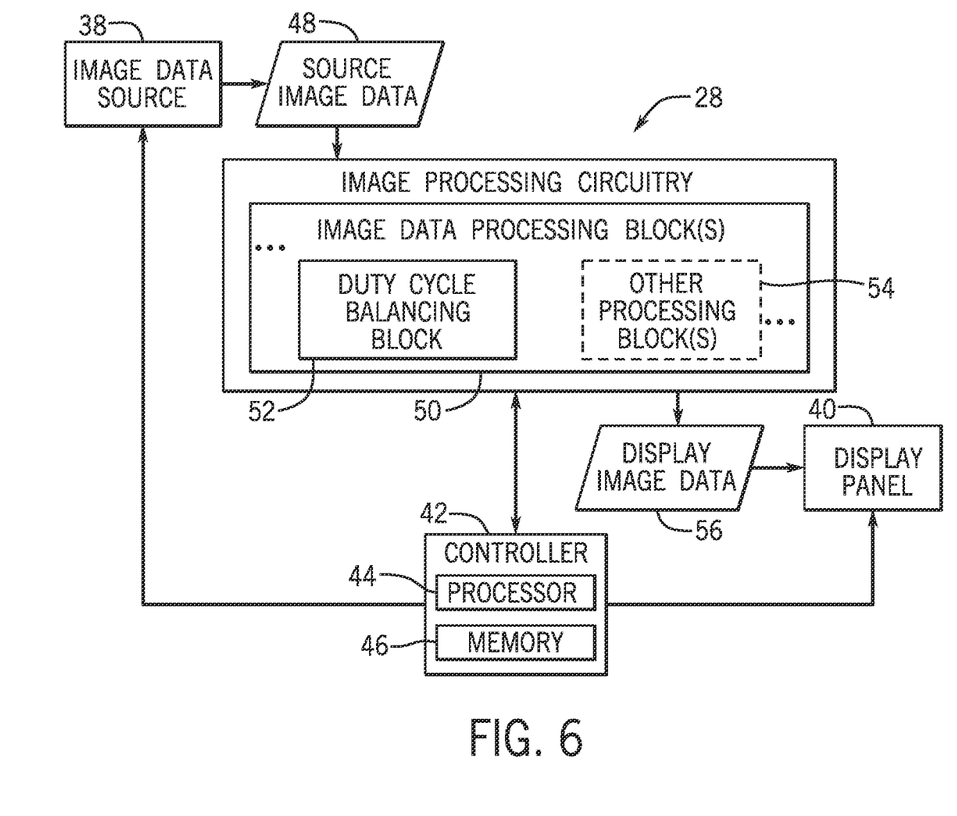
FIG. 6 is a block diagram of the image processing circuitry of FIG. 1 including a duty cycle balancing block, in accordance with an embodiment.

To help illustrate, a portion of the electronic device 10, including image processing circuitry 28, is shown in FIG. 6. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a duty cycle balancing block 52. As should be appreciated, multiple other processing blocks 54 may also be incorporated into the image processing circuitry 28, such as a color management block, a dither block, a burn-in compensation (BIC) block, a scaling/rotation block, etc. before and/or after the duty cycle balancing block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As discussed herein, the electronic display 12 may utilize one or more illuminators (e.g., backlights, projectors, etc.) such as light emitting diodes (LEDs), organic LEDs (OLEDs), etc. to generate light and one or more mirrors to selectively direct the light to pixel locations according to the display image data 56. In some embodiments, the display image data 56 may include a set of bitplanes that set the arrangement of the mirrors to control the light to the pixel locations. For example, a bitplane may set a portion of the mirrors to reflect light generated by an illuminator to a respective portion of pixel locations, and set other mirrors, associated with other pixel locations, to reflect the light to one or more light attenuators, as discussed further below. As such, the bitplane may designate certain pixel locations as "on" and other pixel locations as "off". During an image frame, multiple bitplanes for each color component may be implemented such that, in the aggregate, the relative on/off time for each pixel location is indicative of the image. As should be appreciated, the human eye may temporally average the light emissions to perceive the image over the image frame.

As discussed further below, mirrors may have a hinge that articulates the mirror between the "on" position (e.g., directing light towards the pixel location) and the "off" position (e.g., directing light towards the light attenuator). Over the course of the life of the electronic display, the mirrors may be directed to either the on position or off position multiple times, and a landed duty cycle for an individual mirror may be defined as a ratio of percentages of how often the mirror landed in (e.g., was placed into or was in) the on position versus landed in the off position. In some scenarios, the hinge of a mirror may exhibit hinge memory, favoring and possibly sustaining just one position (e.g., the on position or the off position), which may lead to image artifacts associated with an incorrect position of the mirror. Furthermore, asymmetric landed duty cycles for a mirror may increase the likelihood of the hinge for that mirror exhibiting hinge memory. As such, in some embodiments, the duty cycle balancing block 52 may generate balancing bitplanes (e.g., during off periods of an image frame) to help maintain a balanced landed duty cycle for at least the portion of the image frame(s) that the balancing bitplanes are utilized. For example, if an emission duty cycle of the electronic display 12 is 25% (e.g., light is emitted from the pixel locations for 25% of the time of the image frame, then 75% of the image frame may be an off period, where balancing bitplanes may be utilized to help weight the landed duty cycle of the mirrors towards a 50/50 balance.

As discussed herein, an illuminator (e.g., backlight or projector) may generate light for multiple different pixels, and a portion of the generated light may be emitted based on a luminance value corresponding to the image data for the pixel. In some embodiments, the electronic display 12 may include illuminators for multiple different color components (e.g., a red illuminator, a green illuminator, a blue illuminator, a white illuminator), and the light generated by each of the different color illuminators may be directed (e.g., via a light guide, one or more mirrors, via one or more color filters) to the pixel locations of the electronic display. As should be appreciated, such electronic displays 12 may include reflective technology displays (e.g., digital micromirror displays (DMDs), ferroelectric-liquid-crystal-on-silicon (FLCOS) display, etc.).

Figure 7:
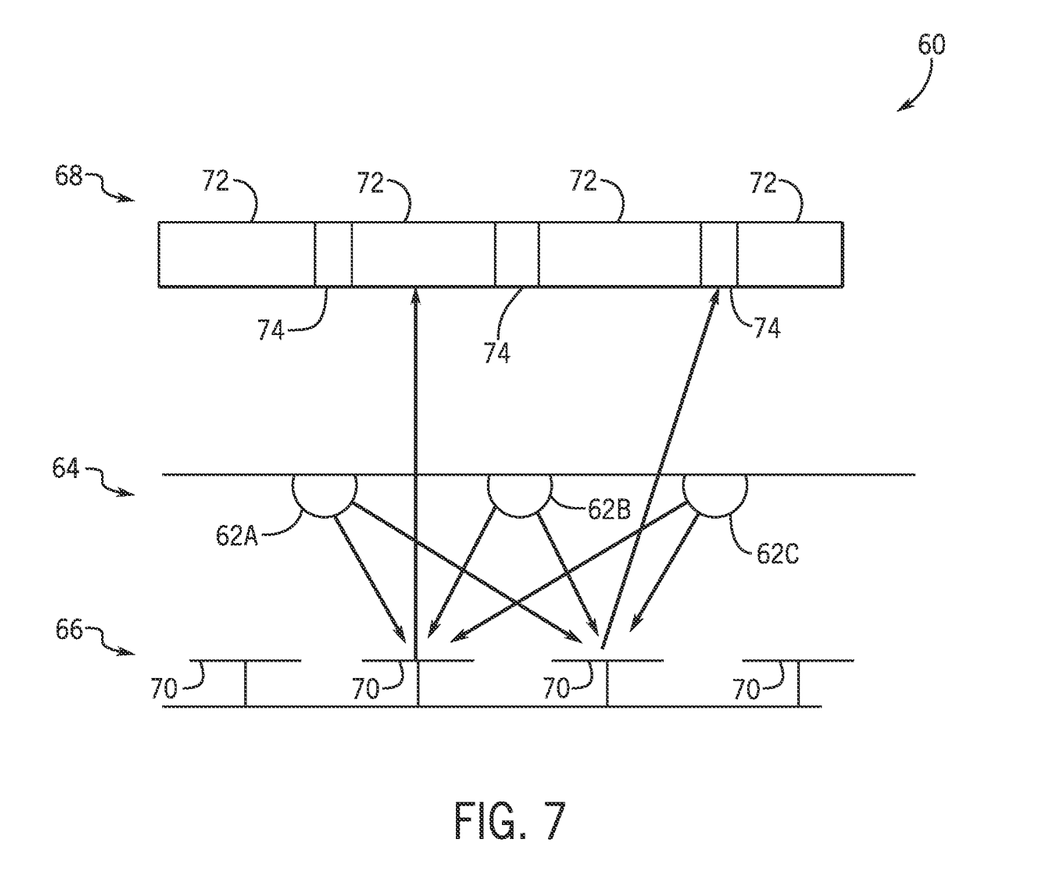
FIG. 7 is a schematic view of an example reflective technology display, in accordance with an embodiment.
Figure 8:
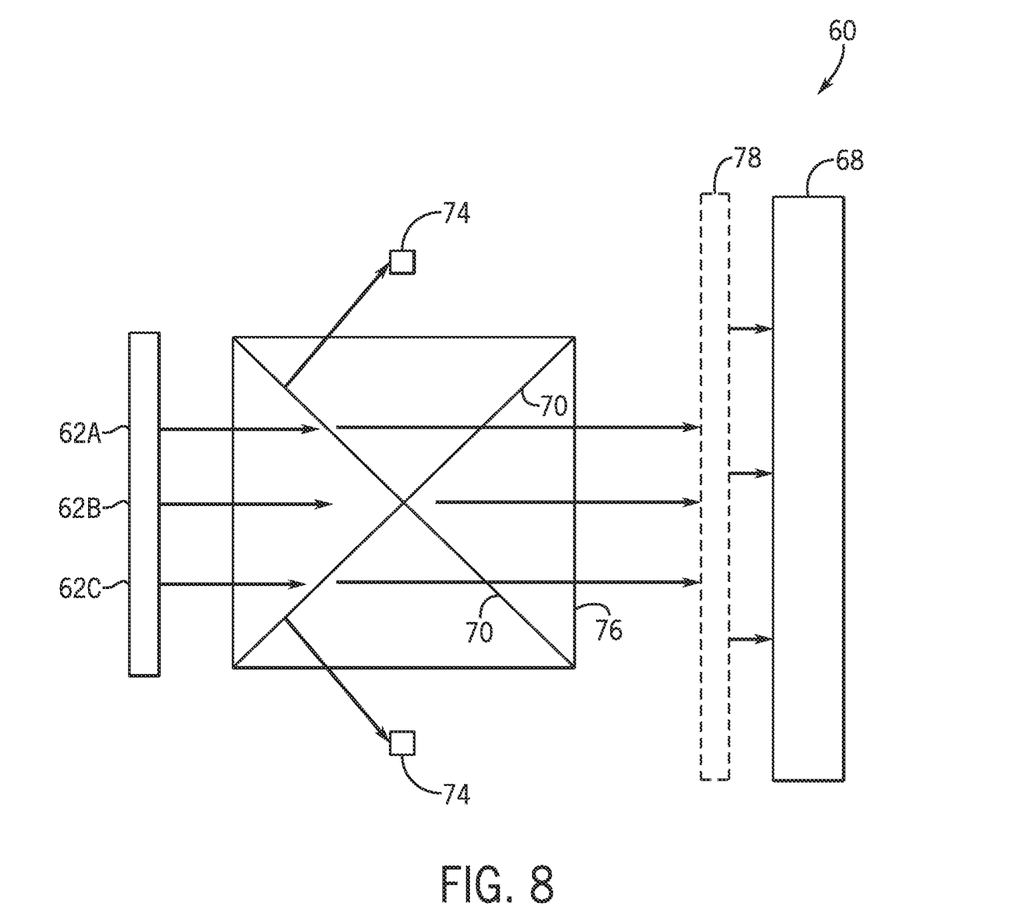
FIG. 8 is a schematic view of an example reflective technology display with a mirror array, in accordance with an embodiment.

To help illustrate, FIGS. 7 and 8 are schematic views of example reflective technology displays 60 having different color component illuminators 62. In some embodiments, a reflective technology display 60 may include an illuminator layer 64, a reflective layer 66, and a pixel layer 68, as in FIG. 7. For example, the illuminator layer 64 may include different color component illuminators 62 (e.g., a red illuminator 62A, a green illuminator 62B, and a blue illuminator 62C, collectively 62) that generate light in their respective color. The reflective layer 66 may include one or more mirrors 70 that reflect the light generated by the illuminators 62 to one or more pixel locations 72 of the pixel layer 68. At each pixel location 72, the light generated by the illuminators 62 may be visible on the electronic display 12 according to the display image data 56. For example, the mirrors 70 may reflect a portion of the generated light to a pixel location 72 for a certain duty cycle to provide a particular luminance level for an image frame. Additionally, in some scenarios, the pixel locations 72 may include active pixels that regulate the amount of light passing therethrough (e.g., based on the display image data 56).

Furthermore, in some embodiments, the mirrors 70 may direct light from the illuminators 62 to either the pixel locations 72 or to one or more light attenuators 74. A light attenuator 74 may include a heat sink and/or a light absorbing surface such as a black mask. If a pixel location 72 is not to receive light (e.g., based on the display image data 56), a mirror 70 may direct the light from the illuminator 62 to a light attenuator 74 instead of the pixel location 72, effectively turning "off" the pixel at the pixel location 72 for that time. For example, an image frame may be divided into multiple sub-frames (e.g., each having a respective bitplane) such that the mirrors 70 alternate between directing the generated light to the pixel location 72 and the light attenuator 74 according to the display image data 56 (e.g., bitplanes). In the aggregate, the amount of time that the pixel location 72 is emitting the generated light is proportional to the desired luminance output at the pixel location 72 (e.g., according to the display image data 56). Moreover, the same mirrors 70 may be used in a time-multiplexed way for different color channels. For example, the red illuminator 62A may be on for a first period, the green illuminator 62B may be on for a second period, and the blue illuminator 62C may be on for a third period, and each mirror 70 may correspond to a pixel location 72 that may display red light during the first period, green light during the second period, and blue light during the third period. In some embodiments, each pixel location 72 has a dedicated mirror 70.

In some embodiments, the mirrors 70 may be disposed in a mirror array 76, as in FIG. 8. For example, the illuminators 62 may project light to a mirror array 76 having separate mirrors for different pixel locations 72. Moreover, in some embodiments, a light guide 78 may further direct the reflected light from the mirror array 76 to the pixel locations 72 of the pixel layer 68 for viewing. Additionally, the mirror array 76 may direct the generated light to a light attenuator 74 or to the viewed portion of the pixel layer 68 via or sans light guide 78. Although shown as a unidirectional light guide 78, as should be appreciated, the light guide 78 may direct the light from the mirror array 76 in any suitable direction to be viewed at the corresponding pixel locations 72 on the electronic display 12.

The mirror array 76 may be modulated such that the light emitted by the illuminators 62 appears as an image corresponding to the display image data 56. For example, independent mirrors 70 of the mirror array 76 may switch between an on-state (e.g., directed toward the pixel locations 72) and an off-state (e.g., directed towards a light attenuator 74) based on the display image data 56. In the on state, the mirrors 70 of the mirror array 76 may direct the light from the illuminators 62 to respective pixel locations 72. In the off state, the mirrors 70 of the mirror array 76 may direct the light elsewhere, such as the light attenuator 74, making the associated pixel location 72 appear dark. In general, the mirrors 70 may be toggled between the on-state and the off-state quickly to create small bursts of light, and the eyes of the viewer may integrate the light to form an image corresponding to the display image data 56.

Figure 9:
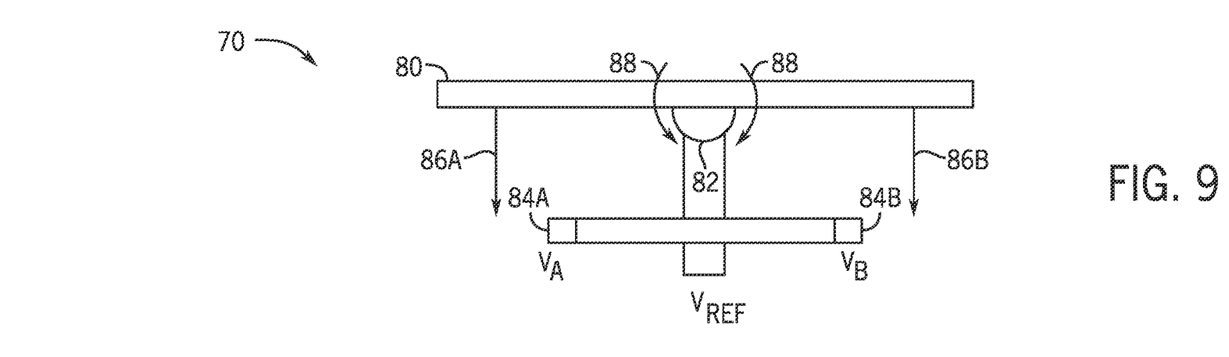
FIG. 9 is a schematic diagram of a mirror of the example reflective technology displays of FIGS. 7 and 8, in accordance with an embodiment.

A mirror 70 (e.g., micromirror) of a reflective technology display 60 may include a reflector 80 mounted on a hinge 82 (e.g., torsion hinge), as shown in FIG. 9, that can articulate the reflector 80 between the "on" position (e.g., directing light towards the pixel location 72) and the "off" position (e.g., directing light towards the light attenuator 74). Furthermore, power (e.g., $V_A$ and $V_B$ relative to a reference, $V_{ref}$) may be applied to electrodes 84A, 84B to generate respective electromagnetic forces 86A, 86B (cumulatively 86), such as electrostatic attraction, that articulates the reflector 80 about the hinge 82. The articulation caused by the electromagnetic forces 86 changes the angle of the reflector 80 and therefore sets the state (e.g., on or off) of the mirror 70.

During the life of the electronic display 12, the mirrors 70 may be directed to either the on position or off position multiple times. However, in some scenarios, the difference between the number of times and/or total time a mirror is set to the on position and the number of times and/or total time the mirror is set to the off position may accumulate. This accumulation may increase the likelihood that the mirror 70 will exhibit hinge memory, favoring and possibly sustaining just one position (e.g., the on position or the off position), which may lead to image artifacts associated with an incorrect position of the mirror. For example, if a mirror 70 is placed into or maintained in one position more often than the other, residual torsional forces 88 may develop that, if significant enough, may be too high for the electromagnetic forces 86 to overcome. In such a case, the mirror 70 may become "stuck" in a single position (e.g., the on position or the off position). If this happens, a mura image artifact may appear on the display at that pixel position (e.g., the pixel is always dark or the pixel is always bright).

A landed duty cycle denotes the relative difference of on and off time for an individual mirror 70 as a ratio of percentages for when the mirror 70 landed in (or was maintained in) the on position versus when it landed in (or was maintained in) the off position. For example, a landed duty cycle of 50/50 is indicative of a mirror 70 that has spent half of its past activations in the on position and half of its past activations in the off position. Similarly, a landed duty cycle of 20/80 is indicative of a mirror 70 that has spent 20% of its past activations in the on position and 80% of its past activations in the off position. As noted above, asymmetry among the past activations may cause residual torsional forces 88 to develop. As such, asymmetric landed duty cycles for a mirror 70 may increase the likelihood of that mirror 70 to exhibit hinge memory. Additionally, the degree of the asymmetry may be proportional to the likelihood that the residual torsional forces 88 that may develop will be significant enough to maintain the mirror 70 in a single position. In other words, the higher the degree of asymmetry, the more likely the mirror 70, and thus the display panel 40, will exhibit a reduced lifespan. For example, a mirror 70 with a 70/30 landed duty cycle may be more likely to exhibit hinge memory than a mirror with a 40/60 landed duty cycle. Said another way, the more balanced the landed duty cycle is for a particular mirror 70, the longer the statistical lifespan of that mirror 70 will be. As such, it may be desirable to balance the landed duty cycle of the mirrors 70 of the reflective technology display 60.

Figure 10:
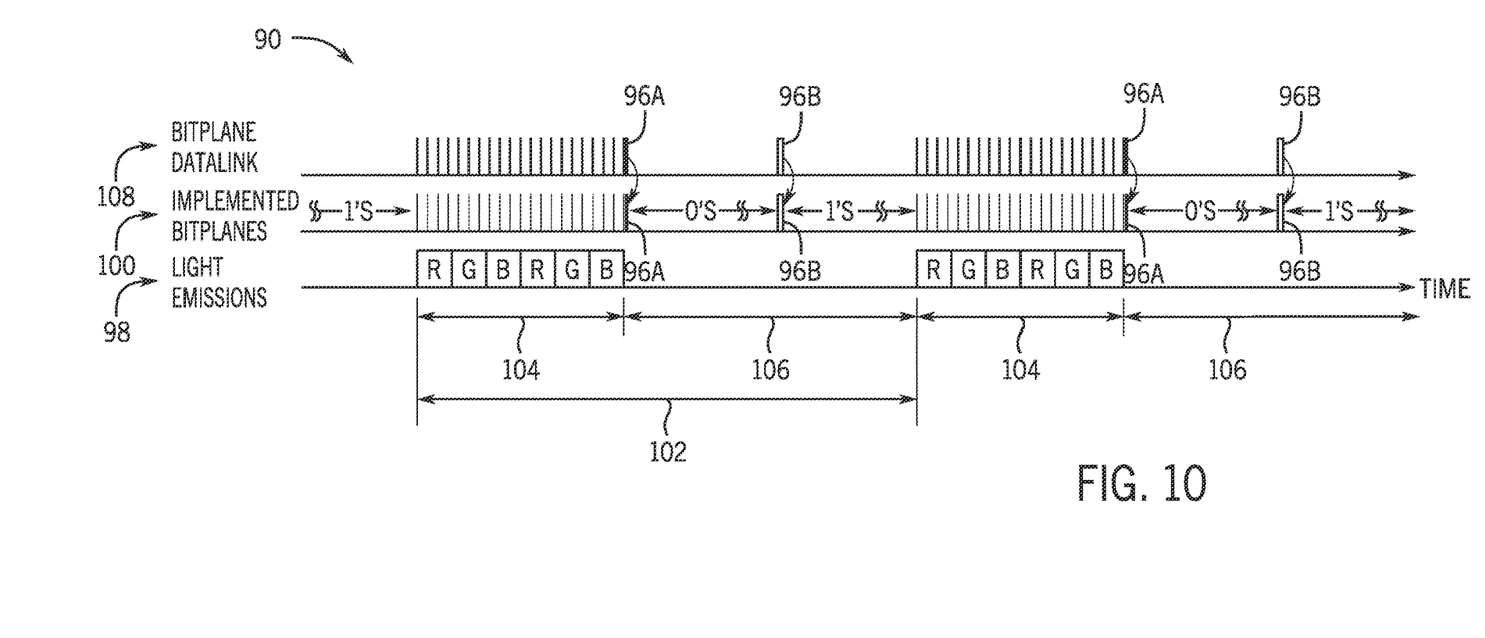
FIG. 10 is an example timing diagram for implementing balancing bitplanes between light emissions from the electronic display via a bitplane datalink, in accordance with an embodiment.
Figure 11:
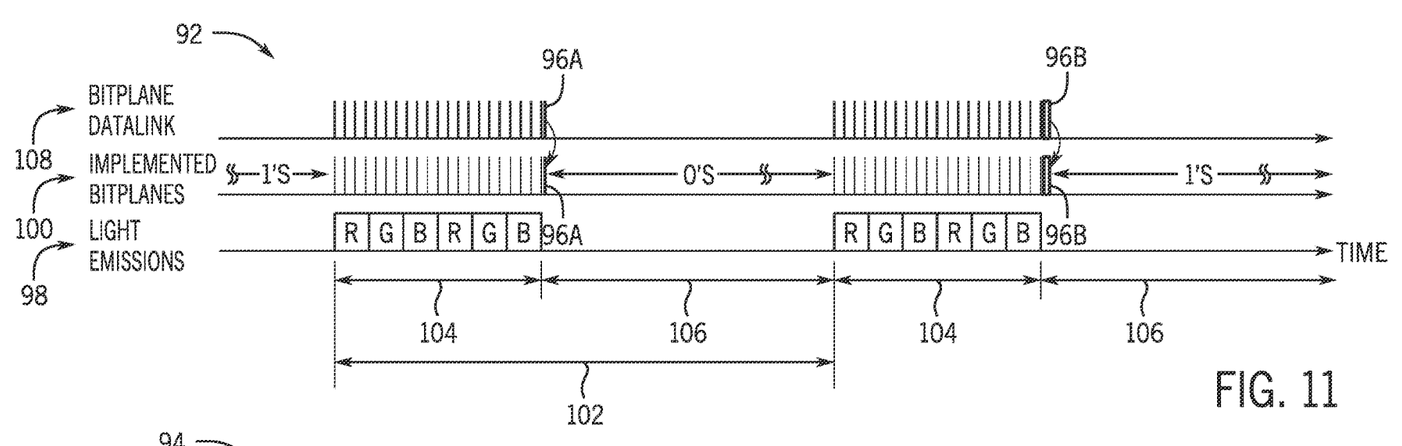
FIG. 11 is an example timing diagram for implementing balancing bitplanes between light emissions from the electronic display via a bitplane datalink, in accordance with an embodiment.
Figure 12:
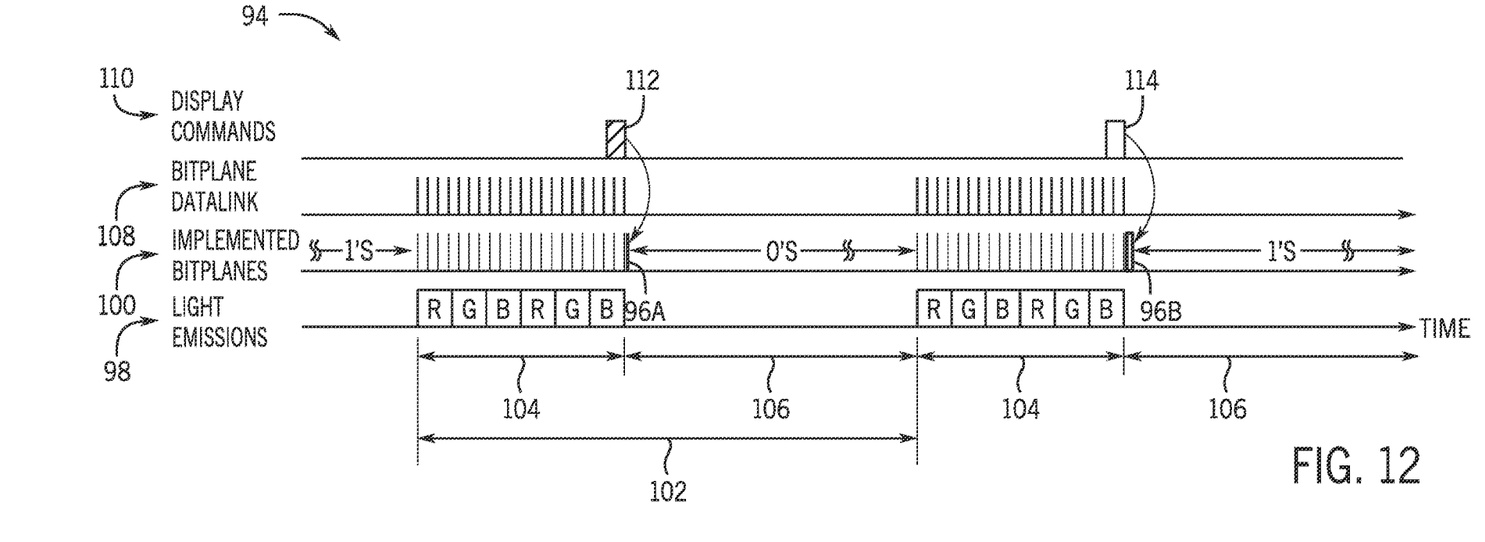
FIG. 12 is an example timing diagram for implementing balancing bitplanes between light emissions from the electronic display via display commands, in accordance with an embodiment.

FIGS. 10-12 are example timing diagrams 90, 92, and 94 for implementing balancing bitplanes 96A, 96B (cumulatively 96) between light emissions 98 from the electronic display 12. As discussed herein, the electronic display 12 may display an image frame by modulating the amount of time each color illuminator 62 has light emitted from a pixel location 72. Implemented bitplanes 100 set the arrangement of the mirrors 70 that control the light emitted from the pixel locations 72. For example, an implemented bitplane 100 may set a portion of the mirrors 70 to reflect light generated by an illuminator 62 to a respective portion of pixel locations 72, and set other mirrors 70, associated with other pixel locations 72, to reflect the light to the light attenuator(s) 74. As such, the implemented bitplanes 100 may designate certain pixel locations 72 as "on" and other pixel locations as "off". During an image frame, multiple implemented bitplanes 100 may be used for each color component such that, in the aggregate, the relative on/off time for each pixel location 72 is indicative of the display image data 56 for each color component and, thus, the image. As should be appreciated, the human eye may temporally average the light emissions 98 to perceive the image over the image frame.

In some scenarios, the frame length 102 of the image frame may be longer than the emission period 104 of the light emissions 98 of the illuminators 62, leaving off periods 106 between light emissions 98 associated with displaying the image. As used herein, the frame length 102 of the image frame is the time between starts of emission periods 104 associated with separate image frames and includes the off periods 106 after and/or between emission periods 104 of the same image frame. The off periods 106 are indicative of moments where no light is desired to be emitted from the pixel locations 72. As should be appreciated, while the illustrated emission periods 104 include back-to-back light emissions 98 of multiple different color components, the light emissions 98 may be separated throughout the image frame such that the image frame includes multiple emission periods 104 and off periods 106 therebetween.

In general, the implemented bitplanes 100 associated with displaying an image may be provided via a bitplane datalink 108. The bitplane datalink 108 may be associated with image processing operations, such as via the image processing circuitry 28. In some scenarios, when the mirrors 70 are set for the last implemented bitplane 100 of an emission period 104, the mirrors 70 may be retained at their most recent setting during the off period 106. However, in some embodiments, balancing bitplanes 96 may be implemented during the off periods 106 to weight the landed duty cycles of the mirrors 70 towards a 50/50 balance. For example, the duty cycle balancing block 52 may track the implemented bitplanes 100 of the emission period(s) 104 and implement one or more balancing bitplanes 96 during the off period 106 to counter asymmetries of the landed duty cycles on a per mirror 70 or per group of mirrors 70 basis. For example, the implemented bitplanes 100 or other form of the display image data 56 may be tracked (e.g., via statistics gathering circuitry of the duty cycle balancing block 52) and balancing bitplanes 96 may be generated to offset asymmetry in the landed duty cycles over one or multiple image frames. However, such tracking and utilization of multiple implemented bitplanes 100 during the off periods 106 may consume power and/or processing bandwidth.

As such, in some embodiments, the off periods 106 may be populated with static balancing bitplanes 96 to increase operating efficiency while still weighting the landed duty cycles of the mirrors 70 towards a 50/50 balance. For example, the duty cycle balancing block 52 of the image processing circuitry 28, may generate balancing "off" bitplanes 96A (e.g., indicative of logical 0s and off positions for a portion of or all of the mirrors 70) and balancing "on" bitplanes 96B (e.g., indicative of logical 1s and on positions for a portion of or all of the mirrors 70) sent via the same bitplane datalink 108 as the display image data 56. As shown in the timing diagram 90 of FIG. 10, the off periods 106 may include both balancing off bitplanes 96A and balancing on bitplanes 96B such that the off period 106 is characterized by a 50/50 balanced landed duty cycle. As should be appreciated, while the balancing off bitplane 96A is depicted as occurring first, followed by the balancing on bitplane 96B, either balancing bitplane 96 may be implemented in any suitable order and any suitable number of times during the off period 106 while maintaining a 50/50 balanced landed duty cycle during the off period 106. Furthermore, as shown in the timing diagram 92 of FIG. 11, the balancing bitplanes 96 may be implemented across separate image frames to further reduce the power and/or processing bandwidth associated with an implemented bitplane 100 via the bitplane datalink 108. As should be appreciated, the balance of the balancing bitplanes 96 may be spread across two or any suitable number of image frames. For example, even image frames may receive balancing off bitplanes 96A during the off period(s) 106 and odd image frames may receive balancing on bitplanes 96B during the off periods 106. Moreover, if image frames are implemented with multiple off periods 106, the same balancing bitplanes 96 may be implemented for each off period 106 of the same image frame or balancing off bitplanes 96A and balancing on bitplanes 96B may alternate for off periods 106 of the same image frame such that the aggregated landed duty cycles of the mirrors 70 during the off periods 106, over one or multiple image frames, is balanced or approximately balanced.

As discussed above, the duty cycle balancing block 52 may generate and relay the balancing bitplanes 96 via the bitplane datalink 108. However, in some embodiments, the duty cycle balancing block 52 may be independent of the other processing blocks 54 and/or independent of the bitplane datalink 108 and, instead, send display commands 110 separate from the bitplane datalink 108, as exampled in the timing diagram 94 of FIG. 12. The display commands 110 may be sent directly to a controller of the display panel 40 (e.g., via a command line and/or lower bandwidth/lower speed datalink than the bitplane datalink 108) and bypass the image processing circuitry 28 and/or the bitplane datalink 108, which may further reduce power consumption and/or processing bandwidth utilization. Indeed, by utilizing display commands 110 separate from the bitplane datalink 108, one or more portions of the image processing circuitry 28 and/or the bitplane datalink 108 may be powered down or placed into a low power mode during the off periods 106, thus saving power. Moreover, in some embodiments, the duty cycle balancing block 52 may or may not be implemented as part of the image processing circuitry 28.

The display commands 110 may include a reset command 112 (e.g., indicative of logical 0s and off positions for a portion of or all of the mirrors 70) and a set command (e.g., indicative of logical 1s and on positions for a portion of or all of the mirrors 70). In other words, the reset command 112 may cause the display panel 40 (e.g., via a controller of the display panel 40 such as controller 42) to generate and implement a balancing off bitplane 96A, and the set command 114 may cause the display panel to generate and implement a balancing on bitplane 96B. As should be appreciated, the reset command 112 and set command 114 may be used in conjunction with one another and implemented across multiple image frames or during the same image frame to achieve a 50/50 landed duty cycle for the off period(s) 106.

Depending on the emission duty cycle (i.e., the ratio of the emission period 104 to the frame length 102) of the electronic display 12, balancing the landed duty cycle of the off period 106 may have more or less effect. For example, by utilizing the techniques discussed herein to balance the landed duty cycles of the off periods 106 of the image frames, an electronic display 12 with an emission duty cycle of 50% may result in total landed duty cycles with a maximum asymmetry of 25/75 (or 75/25) as opposed to 0/100 (or 100/0). Similarly, an electronic display 12 with an emission duty cycle of 25% may result in total landed duty cycles with a maximum asymmetry of 37.5/62.5 (or 62.5/37.5) as opposed to 0/100 (or 100/0), which may significantly increase the life expectancy of the electronic display 12 by mitigating the likelihood of and/or severity of hinge memory. Moreover, although stated herein as achieving a 50/50 landed duty cycle for the off periods 106, as should be appreciated, the landed duty cycle may not be exactly 50/50 when accounting for timing delays, command delays, scheduling delays, and/or non-completed image frames.

Figure 13:
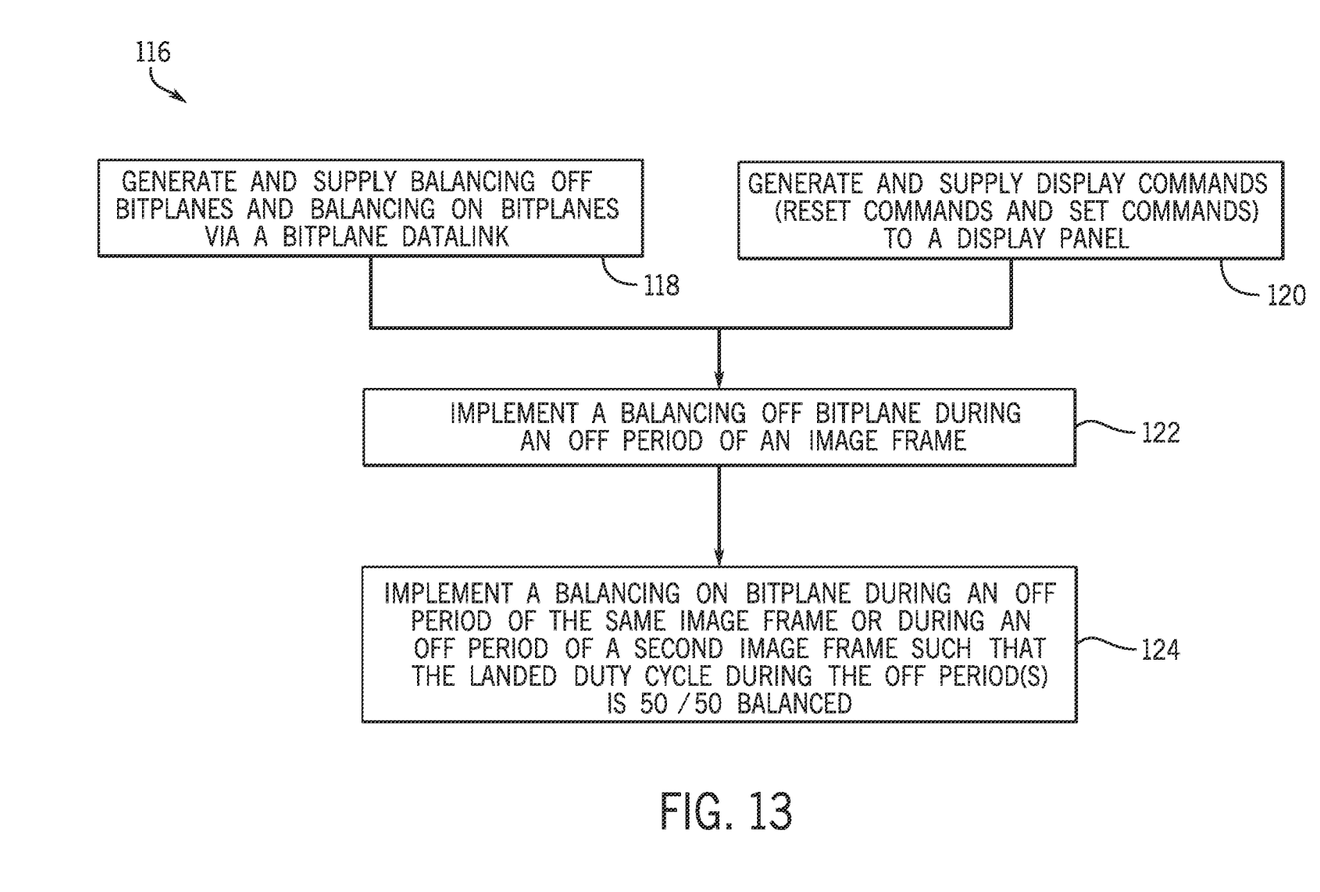
FIG. 13 is a flowchart of an example process for balancing the landed duty cycles of mirrors of a reflective technology display during off periods of image frames, in accordance with an embodiment.

FIG. 13 is a flowchart 116 of an example process for balancing the landed duty cycles of mirrors 70 of a reflective technology display 60 during off periods 106 of image frames. In some embodiments, balancing off bitplanes 96A and balancing on bitplanes 96B may be generated (e.g., via a duty cycle balancing block 52 of image processing circuitry 28) and supplied (e.g., to the display panel 40) via a bitplane datalink 108 (process block 118). Alternatively, display commands 110, such as a reset command 112 and a set command 114, may be generated and sent to the display panel 40 (process block 120) such as via a lower-bandwidth and/or lower power signal path. As discussed above, in some embodiments, the display commands 110 may bypass all or a portion of the image processing circuitry 28 and/or the bitplane datalink 108. Based on the supplied balancing bitplanes 96 from the bitplane datalink or the display commands 110, a balancing off bitplane 96A may be implemented during an off period 106 of an image frame (process bock 122). Additionally, a balancing on bitplane may be implemented during an off period of the same image frame (which could be the same off period 106 or a different off period 106) or during an off period 106 of a second (e.g., subsequent) image frame such that the landed duty cycle during the off period(s) is 50/50 balanced (process block 124). As should be appreciated, the scheduling of the balancing bitplanes 96 may be according to the generated and supplied signals via the bitplane datalink 108 or the display commands 110. As such, the landed duty cycle of the mirrors may have a 50/50 balance during the off periods, weighting the overall landed duty cycle towards a 50/50 balance and reducing the likelihood of hinge memory and statistically increasing the life expectancy of the electronic display 12.

The specific embodiments described above have been shown by way of example, and it should be understood that these embodiments may be susceptible to various modifications and alternative forms. Moreover, although the above referenced flowchart 116 is shown in a given order, in certain embodiments, process/decision blocks may be reordered, altered, deleted, and/or occur simultaneously. Additionally, the referenced flowchart 116 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display configured to display a plurality of image frames, wherein the electronic display comprises:
one or more illuminators configured to generate light during emission periods of the plurality of image frames; and
a plurality of mirrors configured to selectively direct the light to a plurality of pixel locations of the electronic display based on a plurality of bitplanes, wherein each bitplane of the plurality of bitplanes sets an arrangement of the plurality of mirrors; and
duty cycle balancing circuitry configured to generate and provide duty cycle balancing signals to the electronic display, wherein, in response to the duty cycle balancing signals, the electronic display is configured to implement balancing on bitplanes during at least a first portion of off periods of the plurality of image frames and balancing off bitplanes during at least a second portion of the off periods of the plurality of image frames such that, in an aggregate, a ratio of respective on times of the plurality of mirrors to respective off times of the plurality of mirrors is balanced across the plurality of image frames during the off periods.

2. The electronic device of claim 1, wherein the balancing on bitplane is configured to set the arrangement of the plurality of mirrors such that each mirror of the plurality of mirrors is in an on position, and wherein the balancing off bitplane is configured to set the arrangement of the plurality of mirrors such that each mirror of the plurality of mirrors is in an off position.

3. The electronic device of claim 1, wherein implementing the balancing on bitplanes during the first portion of the off periods of the plurality of image frames comprises implementing a balancing on bitplane during a first off period of a first image frame of the plurality of image frames, and wherein implementing the balancing off bitplanes during the second portion of the off periods of the plurality of image frames comprises implementing a balancing off bitplane during a second off period of a second image frame of the plurality of image frames different from the first image frame.

4. The electronic device of claim 1, wherein the electronic device comprises one or more light attenuators, wherein, during the emission periods, each of the plurality of mirrors are configured to selectively direct the light to a respective pixel location of the plurality of pixel locations or to a light attenuator of the one or more light attenuators.

5. The electronic device of claim 1, comprising image processing circuitry configured to provide the plurality of bitplanes to the plurality of mirrors via a bitplane datalink.

6. The electronic device of claim 5, wherein the image processing circuitry comprises the duty cycle balancing circuitry, and wherein the duty cycle balancing signals comprise the balancing on bitplanes and the balancing off bitplanes provided via the bitplane datalink.

7. The electronic device of claim 5, wherein the duty cycle balancing signals comprise display commands that are not provided via the bitplane datalink.

8. The electronic device of claim 1, wherein the one or more illuminators comprise one or more light emitting diodes (LEDs).

9. The electronic device of claim 1, wherein each image frame of the plurality of image frames is divided into a single emission period and a single off period.

10. The electronic device of claim 9, wherein implementing the balancing on bitplanes during the first portion of the off periods of the plurality of image frames and implementing the balancing off bitplanes during the second portion of the off periods of the plurality of image frames comprises:
implementing a balancing off bitplane at a beginning of the single off period and implementing a balancing on bitplane at a midpoint of the single off period; or
implementing the balancing on bitplane at the beginning of the single off period and implementing the balancing off bitplane at the midpoint of the single off period.

11. A method comprising:
supplying a balancing off bitplane to a plurality of mirrors during a first off period of a first image frame, wherein the balancing off bitplane is configured to set each of the plurality of mirrors to an off position; and
supplying a balancing on bitplane to the plurality of mirrors during a second off period of a second image frame, wherein the balancing on bitplane is configured to set each of the plurality of mirrors to an on position, wherein, in an aggregate of the first off period and the second off period, a first amount of time that the plurality of mirrors are in the off position is balanced by a second amount of time that the plurality of mirrors are in the on position.

12. The method of claim 11, comprising:
supplying, via duty cycle balancing circuitry, a reset command to a display panel, wherein, in response to the reset command, the display panel is configured to supply the balancing off bitplane to the plurality of mirrors; and
supplying, via the duty cycle balancing circuitry, a set command to the display panel, wherein, in response to the set command, the display panel is configured to supply the balancing on bitplane to the plurality of mirrors.

13. The method of claim 11, comprising generating, via duty cycle balancing circuitry, the balancing off bitplane and the balancing on bitplane.

14. The method of claim 13, wherein the balancing off bitplane and the balancing on bitplane are supplied from the duty cycle balancing circuitry to the plurality of mirrors via a bitplane datalink.

15. The method of claim 11, wherein the first image frame comprises a first emission period corresponding to first light emissions that aggregate to form a first image of the first image frame, and wherein the second image frame comprises a second emission period corresponding to second light emissions that aggregate to form a second image of the first image frame.

16. An electronic display comprising:
a plurality of illuminators configured to generate light during emission periods of image frames and to not generate light during off periods of the image frames;
a plurality of mirrors configured to selectively articulate to either an on position or an off position, wherein the on position of a mirror of the plurality of mirrors directs the light, if generated, to a pixel location of a plurality of pixel locations, and wherein the off position of the mirror directs the light, if generated, to a light attenuator; and
a bitplane datalink configured to receive a first plurality of image data bitplanes of a first image frame and a second plurality of image data bitplanes of a second image frame, wherein the plurality of mirrors are configured to selectively articulate during the emission periods of the first image frame and the second image frame according to the first plurality of image data bitplanes and the second plurality of image data bitplanes, respectively, and wherein, during the off periods of the first image frame and the second image frame, each of the plurality of mirrors is configured to articulate to the off position in response to a balancing off bitplane and articulate to the on position in response to a balancing on bitplane, wherein, in an aggregate of the off periods of the first image frame and the second image frame, a first amount of time that the plurality of mirrors are in the off position is balanced by a second amount of time that the plurality of mirrors are in the on position.

17. The electronic display of claim 16, wherein the balancing off bitplane and the balancing on bitplane are supplied to the plurality of mirrors via the bitplane datalink.

18. The electronic display of claim 16, comprising a controller configured to receive display commands separate from the bitplane datalink, wherein the controller is configured to generate the balancing off bitplane and the balancing on bitplane in response to the display commands.

19. The electronic display of claim 16, wherein each mirror of the plurality of mirrors is associated with a single respective pixel location of the plurality of pixel locations.

20. The electronic display of claim 16, wherein the first image frame and the second image frame are different image frames.

* * * * *